United States Patent

[11] 3,610,642

| [72] | Inventors | David Fischer<br>Mainparkstr. 6096, Mainaschaff;<br>Rudolf Kohlert, Frankenstr. 19, Stockstadt,<br>both of Germany |
|---|---|---|
| [21] | Appl. No. | 833,270 |
| [22] | Filed | June 16, 1969 |
| [45] | Patented | Oct. 5, 1971 |
| [32] | Priority | June 14, 1968 |
| [33] | | Germany |
| [31] | | P 17 52 548.3 |

[54] DEVICE FOR CLAMPING WORKPIECES ON MACHINE TOOLS
29 Claims, 12 Drawing Figs.

[52] U.S. Cl. .................................................... 279/1 L,
279/71, 279/114
[51] Int. Cl. ....................................................... B23b 31/16
[50] Field of Search ............................................. 279/1 L, 66,
110, 114, 71

[56] References Cited
UNITED STATES PATENTS
1,812,006  6/1931  Jellicoe .......................... 279/1 L UX

| 2,445,147 | 7/1948 | Meunier ....................... | 279/71 X |
| 2,893,744 | 7/1959 | Anthony ....................... | 279/1 L UX |
| 3,086,784 | 4/1963 | Sloan et al. .................... | 279/110 X |

Primary Examiner—Andrew R. Juhasz
Assistant Examiner—James F. Coan
Attorney—McGlew and Toren ABSTRACT: In a device for clamping workpieces on a machine tool, a housing contains a clamping plate to which is secured a connecting rod for axially displacing the clamping plate and with it a number of clamping jaws mounted within the housing. In addition, a centering plate is operatively associated with the clamping plate and is arranged to displace the clamping jaws radially inwardly and outwardly as it is rotated. As the clamping plate is moved in the axial direction, bolt members having tapered faces interact to rotate the centering plate and displace the clamping jaws radially outwardly and biasing means are mounted within the housing for rotating the centering plate in the opposite direction for displacing the clamp-jaws radially inwardly into the closed position.

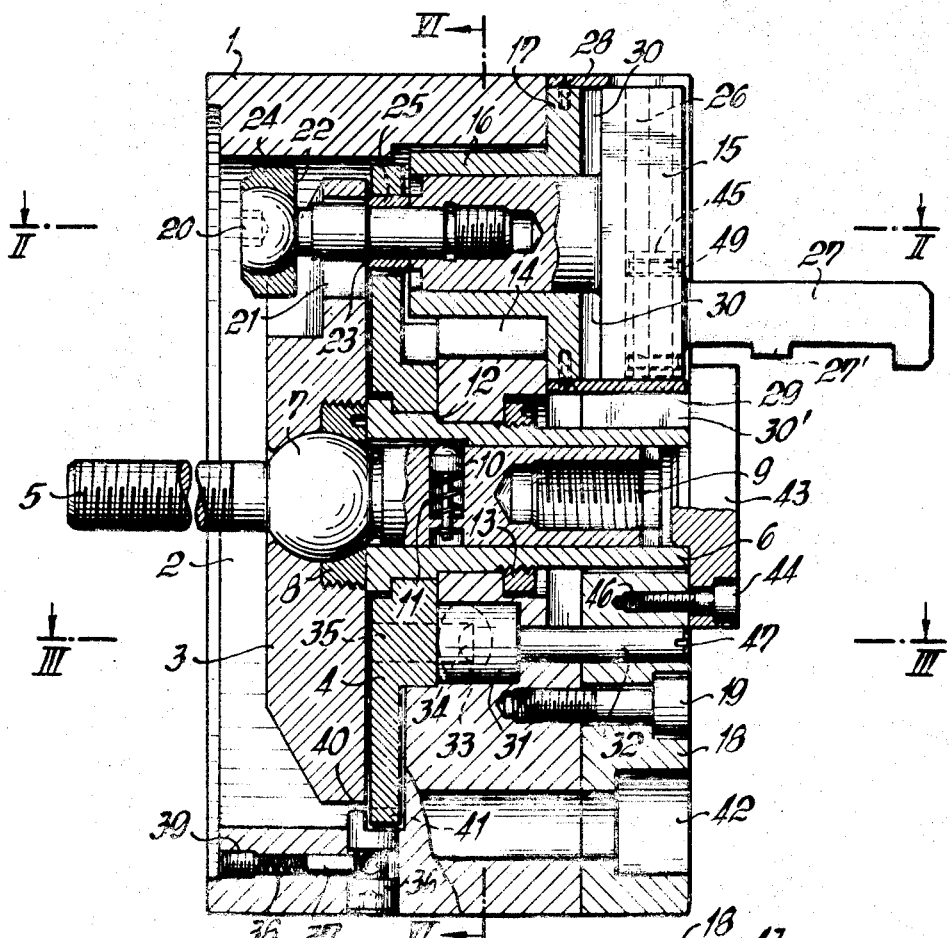
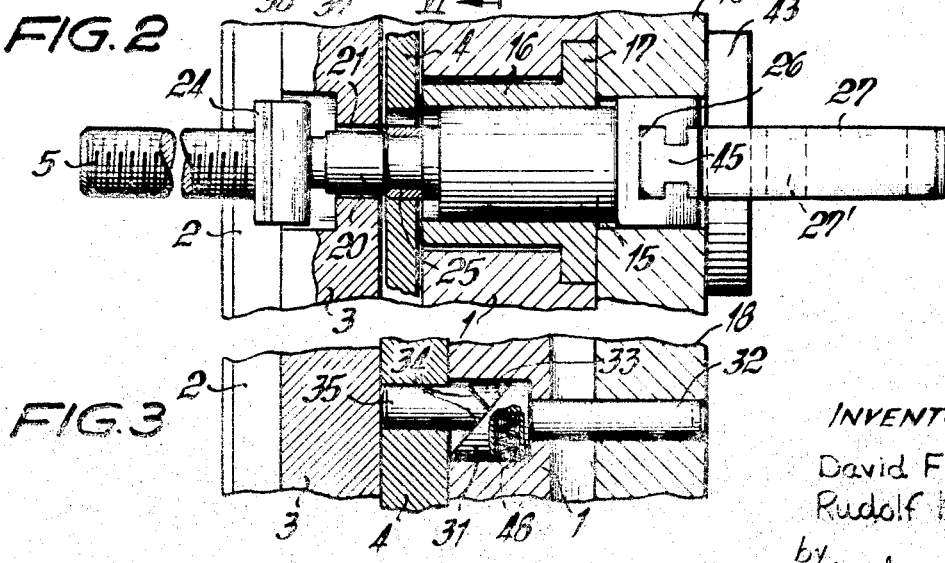
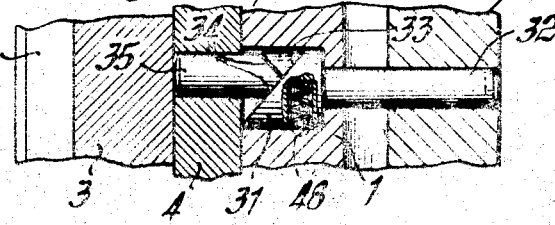

INVENTORS:
David Fischer
Rudolf Kohlert
by McGlew & Toren
ATTORNEYS.

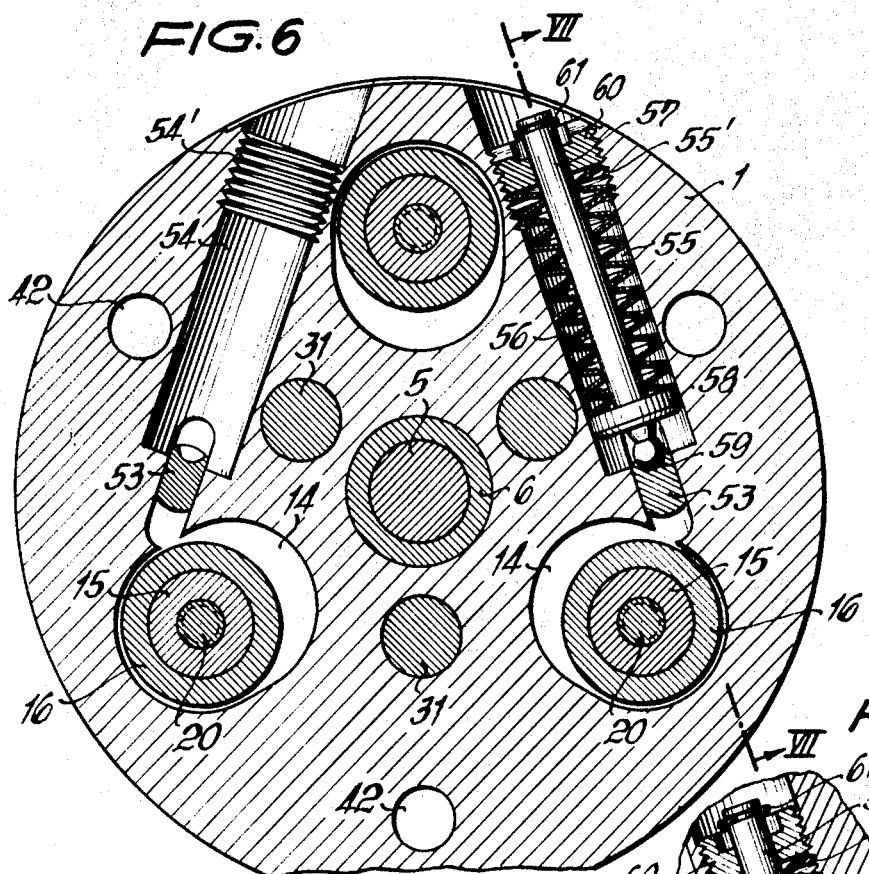
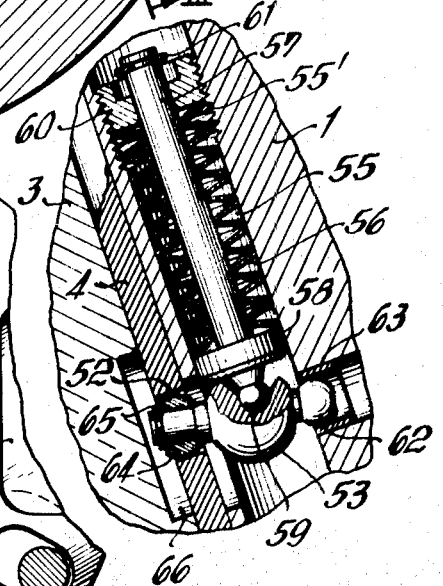
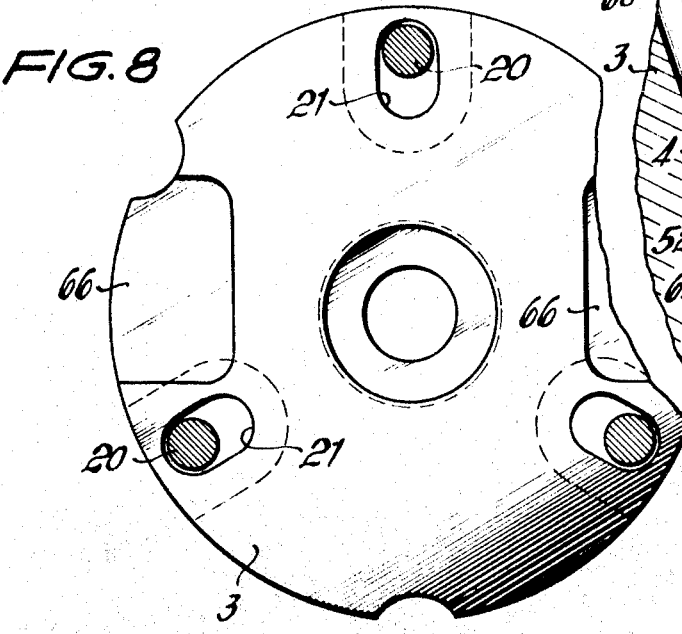

INVENTORS
David Fischer
Rudolf Kohlert
by McGlew & Toren
ATTORNEYS.

DEVICE FOR CLAMPING WORKPIECES ON MACHINE TOOLS

SUMMARY OF THE INVENTION

The present invention is directed to a device for clamping workpieces on a machine tool and, more particularly, it is concerned with a device including a clamping plate which is movable in the axial direction and with other cooperating parts effects the radial movement of clamping jaws and their axial movement for opening and closing the device and for positioning the workpiece.

Devices for clamping workpieces, also known as chucks, have been known in the past and can be operated either by hand or mechanically. A typical known chuck is the so-called three-jaw chuck which clamps workpieces radially and in which the jaws are spaced angularly apart and can be moved radially inwardly toward and away from each other for clamping and releasing the workpiece.

It has also been known to use chucks which clamp a workpiece in the axial direction. Such chucks are required when the workpiece cannot be clamped radially for reasons of strength or because of the machining operations which are to be performed on the workpiece. Chucks of this type are usually equipped with three fingers and are referred to as finger chucks. The fingers grip the workpiece with bent-up ends and press it against a support. Employing a clamping plate which can be swiveled ensures that a uniform clamping force is transmitted to each of the fingers. During the clamping and releasing action on the workpiece, the fingers are turned to permit the workpiece to be inserted between or removed from the fingers. Further, it is necessary that the bent-up ends of the fingers rest flat on the bearing surfaces of the workpiece in order to avoid any damage to it and as a result, such finger chucks can only be employed within a limited clamping range. Where workpieces of varying shape or having dimensions beyond the clamping range are required to be clamped axially, it becomes necessary to make a new finger chuck. If extensive production is to be obtained from the special chuck, its manufacture is economically justifiable, however, if only limited use is to be obtained from the chuck, then its cost is not justifiable. In such a case each workpiece must be clamped laboriously by means of auxiliary devices, and as a result, manufacturing costs are increased.

Another disadvantage experienced in presently used finger chucks stems from the fact that the fingers perform a swiveling movement which always terminates at the same point so that it is not possible to center workpieces having varied dimensions such as in the case of unmachined workpieces. In such instances, additional centering devices separate from the clamping fingers become necessary for the machining operation.

The present invention is directed to the problem of providing a chuck or clamping device which permits both centering and axial clamping of the workpiece in a very simple manner and one which has a universal applicability. In the device embodying the present invention, a centering assembly is provided for centering the workpiece while the clamping jaws are being moved radially inward. In this arrangement the clamping jaws are mounted in sliding bushes which afford both a radial movement and an axial displacement.

During the centering of the workpiece, each of the clamping jaws moves inwardly in a rectilinear fashion radial to or perpendicular with the central axis of the device. Because of this arrangement, the device can be designed for a very small axial stroke.

The centering assembly consists of a centering disk in combination with guide surfaces which convert axial into rotary movements for rotating the centering disk in opposite directions and thereby effecting the opening and closing movements of the clamping jaws. As the centering disk rotates, it causes the sliding bushes which mount the clamping jaws to be moved in the radially inward and outward direction In rotating the centering disk in one direction, pressure is exerted from a clamping plate onto cooperating wedge surfaces which effect the rotating action and the reverse rotational movement is obtained by a biasing element which absorbs energy during the opposite rotational operation and effects the reverse movement when the clamping plate is moved in the opposite axial direction.

The cooperating wedge surfaces can be provided by bolts bevelled on their juxtaposed ends with one bolt being secured in the centering disk and the other being locked in position in the housing of the device. The biasing element is formed of a plurality of cup springs mounted on a shaft or rod which act against a lever, one end of which is articulated in the centering disk for affording the rotational movement. The design of the lever member is not important, it is only necessary that the energy supplied to the biasing member as the clamping jaws are moved in the opening direction is sufficient to rotate the centering disk in the opposite direction for effecting the closing of the jaws.

As an alternative embodiment, the biasing element can be formed as a hook-shaped tongue member whose ends are designed as bearing pins with one of the pins fitted into a groove in the housing of the device in line with the biasing element and the other bearing pin being inserted into the centering disk. Interchangeable jaws can be used for clamping the workpiece from the inside or from the outside. Accordingly, the biasing element can be inserted selectively in one of two receiving bores in the housing. Similarly, the wedge surfaces for rotating the centering disk can also be reversed by 180° so that the rotational movement of the centering disk can be selected in accordance with he manner in which the clamping jaws are employed.

It is possible to use both clamping jaws and centering jaws, however, the simplest construction of the clamping device is obtained if the jaws used for centering are also employed for the clamping operation so that the centering and gripping of the workpiece can be formed by the same members.

One especially favorable design of the jaws involves a two-part assembly composed of a base jaw and an adjustable interchangeable jaw. With such a clamping device, it is possible to center and clamp workpieces of different diameters. Accordingly, it is necessary only to adjust the jaws radially according to the diameter of the workpiece. Where workpieces of varying dimensions are involved, interchangeable jaws can be selected in accordance with the corresponding dimensions of the workpieces of various dimensions.

In addition to the connection between the jaws and the centering disk, the jaws are also engaged with the clamping plate by means of studs having a ball-shaped portion. The clamping device is designed so that the clamping plate can move freely between two stop surfaces on the studs when the jaws are in the opened position. This play is necessary to obtain the centering of a workpiece before the clamping action is commenced. The distance between the stop surfaces and, thus, with a given thickness of the clamping plate, the axial direction to which the clamping plate can move without displacing the jaws in the axial direction is determined by the displacement of the cooperating wedge surfaces which effect the rotational movement of the centering disk.

Since the jaws are connected to the clamping plate by means of the studs radial apertures are provided though the clamping plate which permit the radial movement of the studs during the opening and closing operation of the clamping jaws. Preferably, the studs fit within bushes which bear on guide surfaces in the centering disk. Accordingly, in this manner the movement of the studs on the guide surfaces is facilitated.

The connecting rod for effecting the axial movement of the clamping plate is guided within a bush fitted centrally within the housing of the device. The centering disk is journaled on this centrally positioned bush. As the centering disk rotates on the bush, its movement can be limited by a strain bolt positioned at its peripheral edge whereby a slight movement in the radial direction remains with the bolt in engaging position with the disk. With this arrangement and a corresponding design of the jaws, it is possible to turn the jaws under clamping pressure to produce a very accurate position of the jaws relative to the center axis of the clamping device. Such an arrangement is not possible with the presently known finger chucks. Inaccuracies in the workpiece being centered can then be accommodated by the remaining rotational stroke. The turning of the jaws can be facilitated by providing a projection on each of them on the side facing the workpiece which projection engages an edge of a support within the device when the jaws are closed without a workpiece in position after which the jaws can be turned out or ground out.

In accordance with the present invention, a workpiece to be machined can be centered and clamped with the same jaws. Separate and independently acting adjustable control mechanisms are provided for the centering and for the clamping operations. Accordingly, it is possible to center and clamp even this and easily deformable workpieces. Moreover, as indicated above, it is possible to center the workpieces by gripping them from the inside or outside and also to clamp them axially. In instances where the workpieces require a different dimension of the individual jaws from the center axis of the device, a uniform distribution of the centering force can be obtained with such jaws. As indicated, the clamping device can be used for workpieces of different diameters and, moreover, by exchanging the interchangeable jaws workpieces of different dimensions can be accommodated. Therefore, the clamping device of the present invention can be employed economically for small production runs.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a longitudinal cross sectional view of a clamping device in accordance with the present invention;

FIG. 2 is a partial sectional view taken along line A–B in FIG. 1;

FIG. 3 is a partial sectional view taken along line C–D in FIG. 1;

FIG. 6 is a transverse cross-sectional view taken along line E–F in FIG. 1;

FIG. 7 is a partial cross-sectional view taken along line F–H in FIG. 6;

FIG. 8 is a partial elevational view of the clamping plate illustrated in FIG. 1;

DETAILED DESCRIPTION OF THE INVENTION

Figure 4:
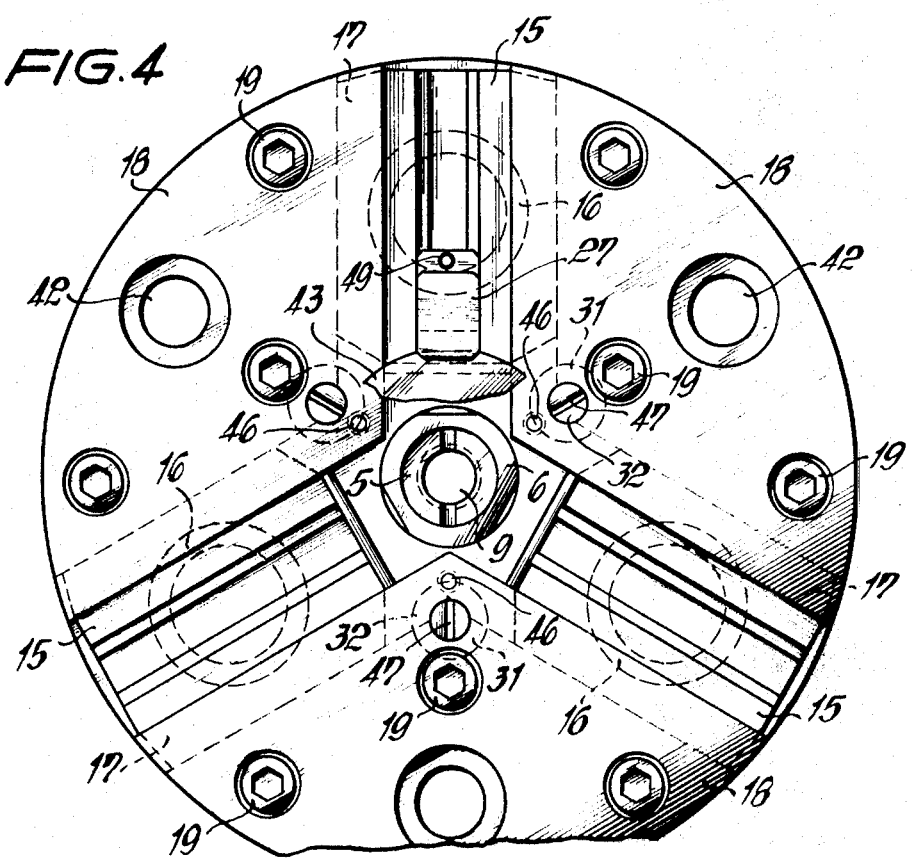
FIG. 4 is an elevational end view of the clamping device in FIG. 1, with a portion being broken away.

In FIG. 1, a clamping device is illustrated formed by a housing 1 having a circular recess 2 in one end containing a clamping plate 3 and a centering disk 4 extending transversely of the longitudinal axis of the housing 1 as indicated by the direction of the arrow X. The clamping plate 3 is mounted within the recess 2 so that it can be moved in the longitudinal direction of the housing 1. Movement of the clamping plate 3 is effected by a connecting rod 5 which extends into a bearing bush 6 fitted within the body 1. The connecting rod 5 has a spherical part 7 which engages a similarly shaped socket in the clamping plate and is held in place by bearing ring 8 which is in threaded engagement in the clamping plate. Due to the spherical configuration of the interengaging surfaces of the clamping plate and the connecting rod, the plate can be swiveled in all directions so that any unevenness in the workpieces to be clamped can be compensated. One end of the connecting rod 5 is provided with a thread for attachment to a coupling rod on the turnbuckle of a machine tool, the opposite end of the rod contains an axially extending bore 9 for receiving an attaching member of a central locking screw, in the event such a screw is employed. Within the bush 6 a locking pin 10 and a spring 11 are positioned transversely through the connecting rod 3 to hold it in a predetermined position.

The bush 6 is inserted into the central bore in the body 1 until its shoulder 12 bears against the body. When it is seated in position the bush is then fixed by means of a nut 13. The centering disk 4 is rotatably mounted on the portion of the bush between the shoulder 12 contacting the body 1 and the adjacent face of the clamping plate 3. Radially outwardly from the bush 6 three recesses 14 are formed in the housing 1 and each contains a sliding bush 16 within which an axially extending portion of a base jaw 15 is seated. In transverse section, as shown in FIG. 6, the recesses are formed by a half circle at the radially inner and outer ends with the half circles being joined by rectilinear extending surfaces. The sliding bushes 16 fit into the half circles and can be displaced in the radial direction through the recesses 14. Since the base jaws 15 are fitted within the bushes the jaws are also displaceable in the radial direction.

At the outwardly facing ends of the sliding bushes, that is, the ends facing to the right in FIG. 1, a rectangular flange 17 is formed extending laterally from the cylindrical portion of the bush and slides along the surface of the body 1 on one face of the flange 17. On the opposite or outer face of the flange 17, segment-shaped plates 18, see FIG. 4, are provided. The plates 18 have the form of circular sectors with the sides thereof cut away in a uniform manner. Each of the plates 18 are secured to the housing 1 by means of three countersunk screws 19 positioned within hexagonal recesses. Secured to each of the base jaws 15 is a stud 20 which extends in parallel relationship with the longitudinal axis of the housing 1. The stud 20 extends through the centering disk 4 and through an aperture 21 in the clamping plate which permits the stud 20 to effect a corresponding movement to the base jaw 15. The arrangement of the stud 20 and the clamping plate 3 permits the clamping plate to move in the longitudinal or axial direction of the housing during a period in which the base jaws cannot be moved in the axial direction for clamping or releasing a workpiece. To afford this characteristic, two stop faces 22, 23 are provided on the stud and the plate 3 can move in the axial direction between these stop faces. The stop face 22 is formed by a support ring 24 mounted on the spherically shaped outer end of the stud 20. The stop face 23 is provided by the annular end surface of a cylindrical bush 25 positioned within the centering disk 4 and which bears on its opposite surface against the base jaw 15. The supporting ring 24 on the spherically shaped end of the stud 20 can be swiveled in all directions for affording the desired accommodation of the clamping plate to any unevenness in the workpieces being clamped. Since the stud 20 is axially displaceable through the bush 25, and the bush is radially displaceable within the centering plate, it has sliding faces on its inner and outer surfaces.

The base jaws 15 are axially displaceable within the sliding bushes 16. Radially extending grooves 26 are provided in the base jaws 15 to receive interchangeable jaws 27, with the interchangeable jaws being positioned within the radial grooves 26 in accordance with the size of the workpiece to be clamped between the jaws. Stripping plates 28, 29, see FIG. 1, extend along the peripheral edges of the flange 17 which form protectors for gaps 30, 30' formed during the radial and axial movement of the base jaw so that contaminating materials do not enter into the gaps and interfere with operation.

Within the housing 1, on the opposite side of the centering disk 4 from the clamping plate 3, a key bolt 31 is positioned and has an extension 32 which extends outwardly through the segment 18 to the end face of the device from which the jaws extend. The key bolts 31 can be rotatably positioned within the housing. Each key bolt has a key face 33 which provides an inclined or wedged surface relative to the transverse surface of the centering disk 4 which it faces, note FIGS. 1 and 3. Key bolts 35 positioned within the centering disk 4 extend toward the key bolts 31, and each key bolt 35 has a pair of inclined or wedged-shaped end surfaces 34 arranged to cooperate with the face 33 on the key bolt 31. The key bolts 35 are displaceable in the longitudinal direction of the housing 1 and can be rotated within narrow limits. As the key bolts 35 are displaced in the longitudinal direction the interaction of the cooperating end faces 33 and 34 provides a rotational movement to the centering disk, which will be described more in detail herein.

A strain bolt 36 mounted within the housing 1 provides an auxiliary means for the adjustment of the jaws. The strain bolt 36 is arranged to be moved between a released position and a locked position relative to a marginal cut or groove formed in the periphery of the centering disk 4. To selectively position the strain bolt, a locking pin 37 extends into engagement with it being held in position by a spring 38 and a screw 39. In the position illustrated in FIG. 1, the strain bolt 36 is in the released position with its nose 40 being displaced out of the marginal cut 41 in the centering disk. Be releasing the strain bolt and rotating it 90° the nose 40 is moved into the marginal cut and effects a stop action for rotational movement of the centering disk. By means of the strain bolt, the rotational movement of the workpiece is interrupted before it reaches its full extent. In the lock position before the centering disk can complete its full rotary movement the interchangeable jaws 27 within the base jaws 15 can be adjusted. When the strain bolt is released by means of the locking pin 37 the nose 40 can be removed from the marginal cut 41 permitting the centering disk to complete its full rotary movement. In accordance with this arrangement, the interchangeable jaws 27 have a setting which permits the centering of workpieces whose diameter is slightly less than the diameter to which the jaws are set.

In addition, bores 42 extend through the housing 1 and the segments 18 for receiving fastening screws for attaching the clamping device on a machine tool. On the center of the face of the device containing the jaws, a support 43 is secured by means of screws 44.

In FIG. 2, a partial view of the clamping device is shown taken along line A-B of FIG. 1. The interchangeable jaws have T-shaped ends 45 which are inserted into the corresponding radially extending grooves 26 in the base jaws 15, as indicated previously the base jaws 15 are held within the sliding bushes 16. The base jaws are guided on their outwardly facing surfaces by the segments 18 attached to the housing 1. Additionally, the segments 18 in combination with the housing 1 form a safe sliding support for the lateral edges of the flange 17.

In FIG. 3, the relative positions of the key bolts 31 and 35 can be seen more clearly. The key bolts 31 can be rotated within the housing 1 through 180°, that is, to position the end face 33 so that it is oriented in the opposite direction. While the key bolt can be turned through 180°, it is held in position within the housing 1. On the other hand, the key bolts 35, as indicated above, can be turned within narrow limits and are fitted into the centering plate for longitudinal displacement over approximately their entire length. As can be noted, the key bolts 35 have two wedge-shaped end surfaces 34 which are disposed at the same angle to the transverse plane of the bolts. Accordingly, if the bolt 31 is reversed so that its end face 33 faces in the opposite direction then it will contact the other one of the end faces 34 on the key bolt 35. This arrangement of the key bolts permits by a simple reversal of a pressure element to be described later, a reversal in the manner in which the interchangeable jaws 27 are mounted so that the clamping device can be employed to hold a workpiece from the inside or the outside. The extension 32 is provided to assure that the key bolts can be turned without disassemblying the device. Because of the relative positions of the key bolts 31, 35 it is possible to rotate the key bolt 31 only when the clamping device is in the closed position, that is, when the clamping plate 3 is axially spaced from the centering disk 4 in which position the key bolt 35 is displaced in the leftward direction from that indicated in FIG. 1 and FIG. 3 releasing the end face 33 so that the bolt can be rotated. As shown in FIG. 3, a catch 48 comprised of a ball and a spring, engages within a depression in the housing 1 and maintains the key bolt in its predetermined position.

In FIG. 4, only one of the interchangeable jaws 27 is illustrated being held within a base jaw 15. The interchangeable jaws are secured in position by means of screws 49. As can be seen in FIG. 1, the interchangeable jaws project in the axial direction outwardly from the face of the clamping device while the base jaws are secured within the housing 1 by means of the segments 18. Further, the lateral edges of the flanges 17 on the sliding bushes are covered by the segments 18. In FIG. 4, the support 43 is cutaway so that the extension 32 of the key bolt 31 can be seen with a slot 47 in its outer end. Moreover, with the support 43 partially removed the bearing bush 6, the connecting rod 5 and the bore 9 in the end of the connecting rod are visible. The angularly spaced bores 46 arranged about the axis of the housing are threaded for receiving fastening screws 44 which attach the support 43 to the device.

Figure 5:
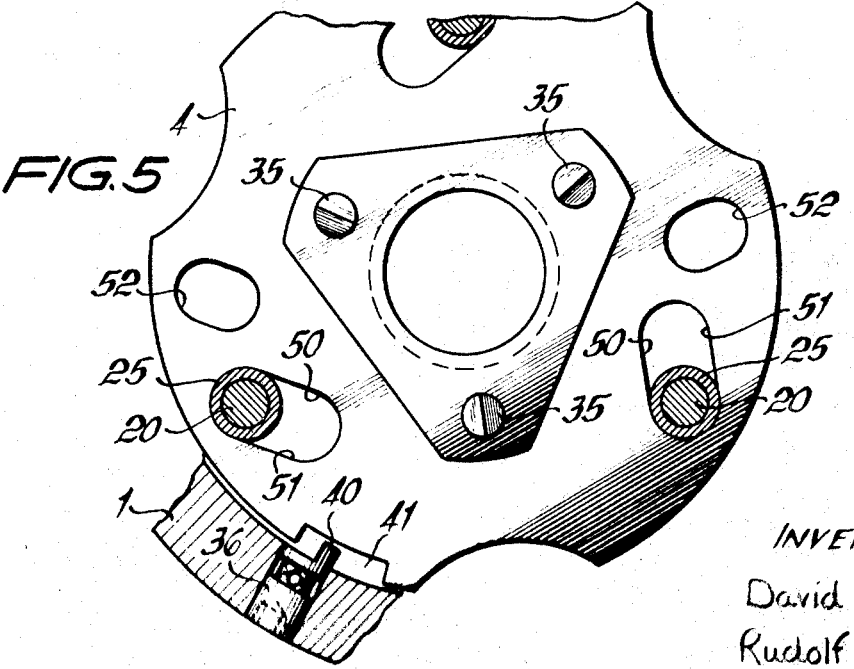
FIG. 5 is a partial elevational view of the centering disk illustrated in FIG. 1.

In FIG. 5, the key bolts 35 are shown inserted into the centering disk 4. The opening through which the stud 20 and its bushes 25 pass are shown having a pair of opposite edge surfaces 50 and 51 which extend parallel to one another. When the centering disk is rotated the bushes 25 slide on these surfaces permitting the base jaws connected to these studs to execute a radially inward and outward movement. If a workpiece is clamped on the outside then the guide surface 50 determines the centering action, on the other hand, if the workpiece is clamped on he inside the guide surface 51 determines the centering.

As described above, the centering disk 4 has a marginal cut 41 formed on its exterior periphery into which the nose 40 of the strain bolt 36 can be selectively positioned for setting the interchangeable jaws 27. The nose of the strain bolt 36 and the marginal cut 41 are dimensioned so that the interchangeable jaws can be set both for inside and outside clamping of the workpiece. If an especially accurate setting of the interchangeable jaws 27 is required, these jaws can be turned down or ground. On the side of the interchangeable jaws which face the workpiece, that is, the inwardly facing side in FIG. 1, a radially extending projection 27' has one of its edge surfaces in contact with the support 43 when the device is closed without a workpiece inserted into it. Accordingly, the interchangeable jaws are brought into position which they assume during the clamping of the workpiece. In this position, play between the individual parts is impossible and the interchangeable jaws can be turned down or ground as required.

On diametrically opposite sides of the centering disk, 4, a pair of oblong openings 52 are provided. One end of a lever 53 is inserted into each of these openings and the function of the levers will be described with relationship to FIG. 6.

In FIG. 6, a cross section is taken through the housing 1 along the line E-F in FIG. 1 looking toward the centering disk 4. Extending chordally through the housing are a pair of bores 54, 55, one of which is arranged to receive a pressure element for effecting a portion of the rotary movement of the centering disk. At the entrance to each of the bores, a threaded 54', 55' is provided. The pressure element consists of a series of cup springs 56 mounted concentrically about a pin member 57 which extends axially through the bore 55 as shown in FIG. 6. Within the inner end of the bore, a disk 58 arranged transversely to the axis of the bore is mounted on the end of the pin member 57 and forms a stop for the cup springs. An extension of the pin member 57 extends through the disk 58 and provides a spherical shoulder 59 which bears in a socket of the lever 53 positioned within the opening 52 in the centering plate. At the outer end of the bore the cup springs 56 are held in position by means of a nut 60 which is threaded onto the pin member 57 and is also screwed into the threaded 55' section. Depending on the number and strength of the cup springs 56 and the extent to which the nut 60 is inserted into the bore, an initial stress is placed on the cup springs which corresponds to the type of workpiece to be centered. For workpieces with thin walls which might be deformed if a large centering force is used, a low initial stress is placed on the cup springs.

As indicated in FIG. 6, the cup springs are contained only within the bore 55 but could also be positioned within the other bore 54. The location of the cup springs within one of these bores determines the motion of the centering disk and of the jaws 15, 27 during the centering operation. Accordingly, the cup springs are selectively inserted into one of the bores 55, 56 depending on whether the clamping device is used for inside or outside gripping of the workpiece. As indicated above, the key bolt 31 and the interchangeable jaws 27 can also be selectively positioned for effecting either inside or outside gripping of the workpiece. In order to avoid any imbalance, an equalizing weight is screwed into the bore which does not contain the cup springs. A retaining ring 61 is provided on the outer end of the pin member 57 for holding the cup springs together when they are removed from the bore.

In FIG. 7, a cross-sectional view of bore 55 is taken at 90° to that indicated in FIG. 6 for indicating the orientation of the lever 53 relative to the bore 55 and to the housing 1 and the centering disk 4. The bore 55 containing the cup springs 56 extends through the housing 1 closely adjacent to the surface of the centering disk 4. At the lower end of the bore the lever 53 extends between the housing 1 and the centering disk 4. At its end within the housing 1 the lever 53 has a spherical part 62 which is mounted within a bearing bush 63. At its opposite end the lever 53 has a cylindrical portion which is rotatably mounted in a ring 64 having a spherically shaped outer surface which is held in place by means of a retaining ring 65. The spherical outer surfaces of ring 64 bear on the surfaces within the opening 52 formed in the centering disk 4. To prevent any obstruction to the movement of the end of the lever 53 within the centering disk 4, a recess 66 is provided in the clamping plate opposite the lever.

In FIG. 8, the recesses 66 are indicated in the clamping plate 3. Further, about each of the apertures 21 through the clamping plate 3 recesses are provided so hat plane surfaces are formed which bear on the supporting ring 24 of the studs when the clamping device is closed.

When the clamping device is arranged for the outside gripping of a workpiece, its individual parts assume the positions shown in the FIGS. When the connecting rod 5 is moved in the direction opposite to arrow X, the plate 3 bears against the bush 6 and against the bushes 25 about the studs 20 within the centering disk 4. In this position, the base jaw 15 and the interchangeable jaws 27 are in the radially outer position, that is, displaced the furtherest distance from the axis of the housing and also displaced axially outwardly from the housing for the maximum extent. The axial displacement of the jaws is caused by the action of the clamping plate 3 against the stop faces of the bushes 25 forcing the base jaw in the rightward direction, as shown in FIG. 1.

The radial movement of the jaws 15 and 27 is effected by the centering disk 4. As the clamping plate moves in the direction opposite to the arrow X, it presses against the key bolts 35 projecting from the centering disk and pushes them though the centering disk into contact with the key bolts 31. As the key bolts are moved through the centering disk the face 34 contacts the face 33 on the oppositely disposed key bolt 31 and, since the key bolt 31 is held in position and the key bolt 35 is capable of rotation, the face 34 rides along the face 33 and causes the centering disk to rotate in a counterclockwise direction. At the same time the inner guide surfaces 50 of the apertures supporting the bushes 25 containing the stud 20 guide the jaws in the radially outward direction. Further, since one end of the lever 53 is held within the centering disk 4 the lever also turns and effects a compressing action on the cup springs within the bore 55. In the radially outward position of the jaws the workpiece can be inserted.

With the workpiece inserted, the centering and gripping action can be commenced. Accordingly, the connecting rod 5 is retracted or moved in the direction of the arrow X and the clamping plate 3 is withdrawn from the bush 6 and the bushes 25. Due to the compressive action imparted to he cup springs 56 during the opening operation, when the clamping plate is pulled away from the centering disk the action of the springs presses downwardly on the lever 53 rotating the centering disk in the clockwise direction with the key bolts sliding against the face of the key bolt 31 and following the movement of the clamping plate 3. Since the centering disk 4 effects a rotational movement opposite to that which occurs in the opening operation, the jaws 15 and 27 are moved radially inward through the action of the bushes 25 on the studs 20 within the apertures in the centering disk. During this inward movement the interchangeable jaws 27 grip the workpiece and center it. The centering force is determined solely by the adjustable gripping force of the cup springs. It should be noted that the centering force acts over one of two of the interchangeable jaws 27 as long as the other two or third interchangeable jaw does not yet contact the workpiece. Accordingly, the workpiece is directed toward the center of the device until all of the three interchangeable jaws grip it with the same centering force. After the workpiece has been centered and gripped there is no further radial movement of the jaws 15 and 27, and the rotary movement of the centering disk is stopped. However, the clamping disk continues to move in the axial direction as it is retracted until it strikes the stop faces 22 formed on the supporting rings 24 of the studs 20. In this manner, the rotary movement of the centering disk and, therefore, the centering is completed before the clamping plate 3 comes into contact with the stop faces 22. When the clamping disk contacts the stop faces 22, the studs 20 and the jaws 15 to which the studs are connected are moved in the axial direction for clamping the workpiece into position. During this axial clamping operation the base jaws 15 are guided within the sliding bushes 16.

Figure 9:
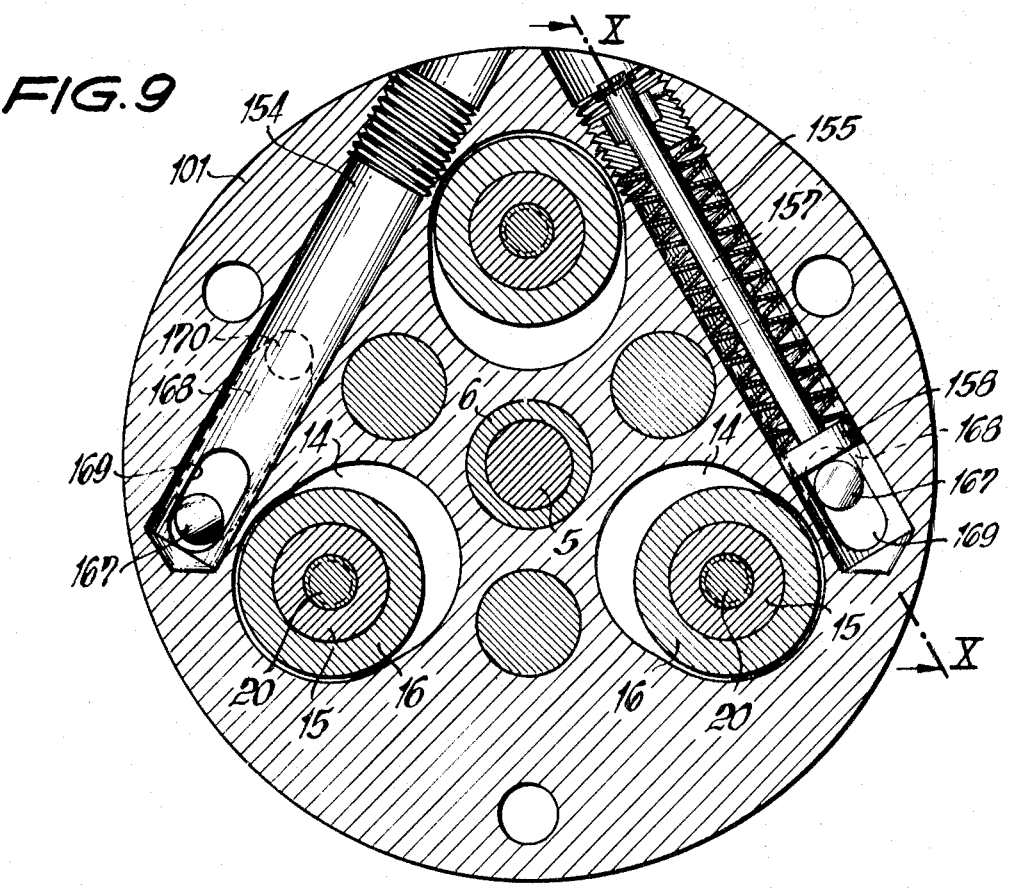
FIG. 9 is a transverse cross-sectional view illustrating an alternate embodiment of the arrangement shown in FIG. 6.
Figure 10:
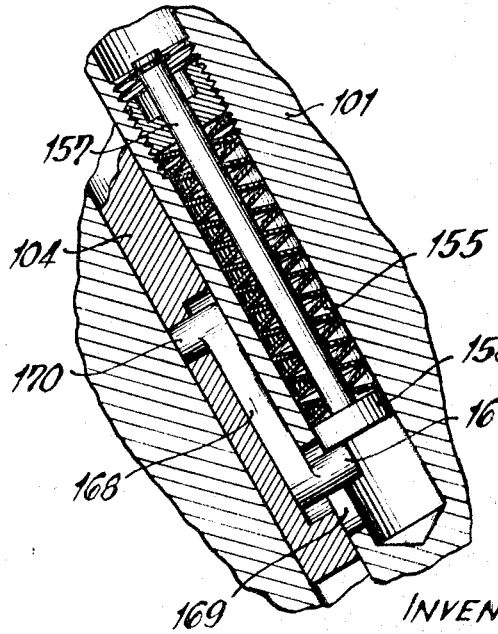
FIG. 10 is a partial cross-sectional view taken along the line I–K in FIG. 9.

Any unevenness in the workpiece can be compensated by the ability of the clamping plate 3 to swivel in any direction which is achieved by means of the ball socket bearings on the connecting rod 5 and on the studs 20. In FIG. 9, a cross section shown through a clamping device equipped with another embodiment of the pressure element for effecting the rotational movement of the centering disk. In this arrangement the housing 101 is provided with a pair of chordally extending bores 154, 155. These bores are similar to the ones shown in FIG. 6, however, they extend for a greater length into the housing and accordingly are capable of receiving a greater number of cup springs. The arrangement of the cup springs is similar to that as described previously, however, the pin member 157 does not have an extension on its end secured to the disk 158 so that the flat surface of the disk bears against a bearing pin 167 of a hook-shaped tongue member 168. The bearing pin 167 is guided in a groove 169 in the housing 101. On the other end of the tongue 168 a bearing pin 170 is inserted into he centering disk 14.

The remaining parts of the clamping device in FIG. 9 are similar to those shown in FIG. 6, and the method of operating the device is also the same. The arrangement of the pressure element shown in FIG. 9, has the advantage that it permits the use of an especially powerful pressure element even with a relatively smaller clamping device.

Figure 11:
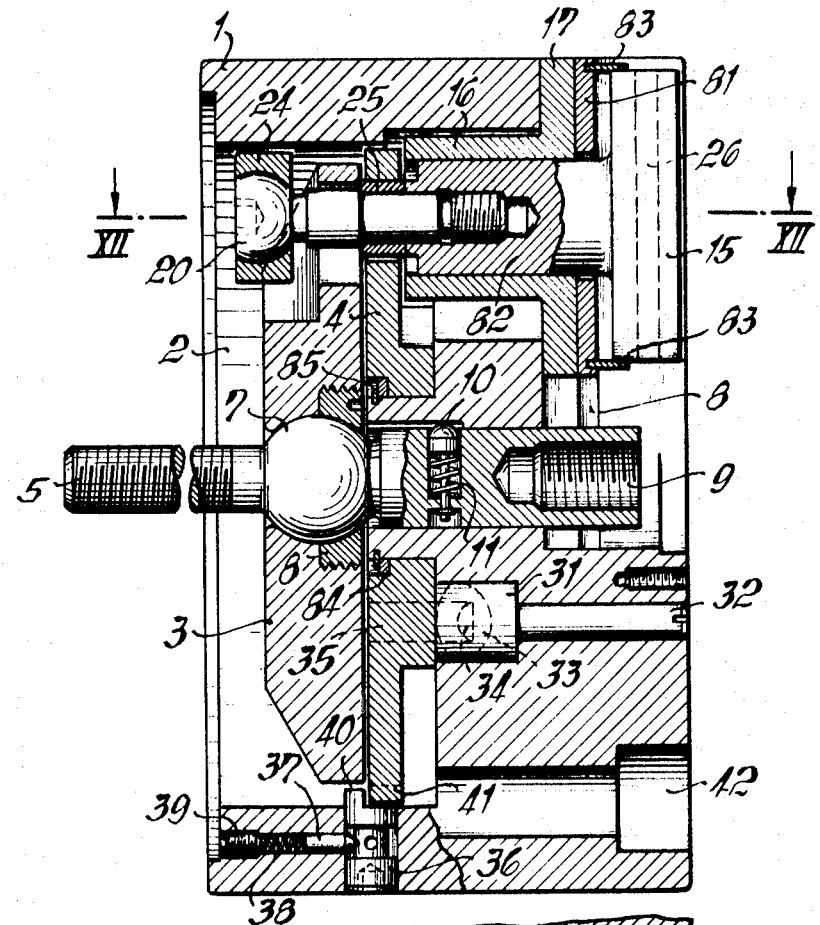
FIG. 11 is a longitudinal cross-sectional view similar to FIG. 1 illustrating another embodiment of the clamping device.
Figure 12:
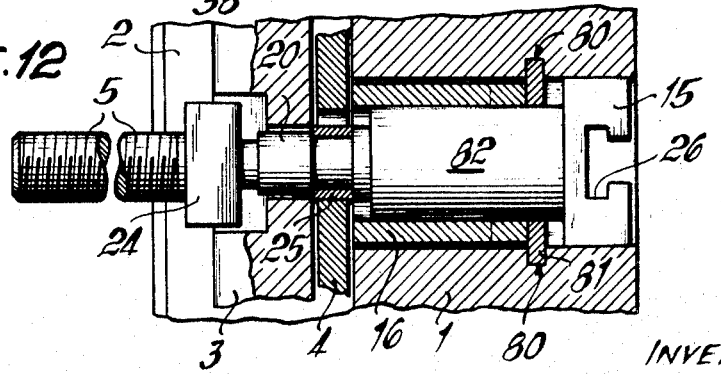
FIG. 12 is a partial cross-sectional view taken along the line M–N of FIG. 11.

In FIGS. 11 and 12, a simplified embodiment of the clamping device is shown as compared to that exhibited in FIG. 1. All of the basic elements of the device, that is, the body 1, clamping plate 3, centering disk 4, the key bolts 31 and 35, the base jaws 15 and their studs 20, and the pressure elements provided by the cup springs 56 are substantially the same as the previously described. However, in this arrangement, there are no segments 18 provided on the clamping face of the device and the connecting rod 5 is guided directly within the housing 1 without the use of a bearing bush 6. In the embodiment in FIG. 1, the segments 18 held and guided the lateral faces of the flanges 17 on the sliding bushes 16, however, in FIGS. 11 and 12, grooves 80 are provided in the housing 1 along the recesses for the base jaws and are engaged in sliding relationship by the lateral edges of guide plates 81. The guide plates 81 have a rectangular form. As can be seen in FIG. 11, the guide plates 81 have apertures through which the stem-shaped extensions 82 of the base jaws 15 pass. By means of the guide plates 81, the flanges 17 slide on the housing 1 only with their lateral edges which project beyond the diameter of the sliding bush in the direction of motion of the sliding bushes.

The edges of the flange 17 which extend in a direction transverse to the movement of the sliding bushes can be eliminated. The function of these edges is assumed by the guide plates 81. When the base jaws 15 are moved in the radial direction the guide plates 81 are displaced in a similar manner. Two spring steel plates 83 are inserted into the guide plates 81 and prevent any penetration of dirt particles between the base jaws 15 and the guide plates 81.

In the axial opening through the housing 1 for the connecting rod 5, the bearing bush 6 is eliminated. A bearing ring 84 secured by a spring clip 85 in an annular groove holds the centering disk 4 in its rotatable position.

What is claimed is:

1. A device for clamping workpieces on machine tools comprising a housing having a longitudinal axis, a clamping plate positioned within said housing and extending transversely of the longitudinal axis thereof, a connecting rod secured to said clamping plate for displacing said clamping plate in the longitudinal axial direction within said housing, a plurality of clamping jaws located within said housing, a centering assembly located within said housing and operatively associated with said clamping plate, and means for securing said clamping jaws within said housing and for mounting said clamping jaws for radial displacement by said centering assembly and for axial displacement by said clamping plate.

2. A device, as set forth in claim 1, wherein said centering assembly comprises a centering plate extending transversely of the longitudinal axis of said housing and having a transverse surface thereof adjacent a transverse surface of said clamping plate, first bolt members being longitudinally axially displaceable through said centering plate and arranged to be contacted by said clamping plate for converting the axial movement of said clamping plate into radial movement of said centering plate.

3. A device, as set forth in claim 2, wherein each of said first bolt members having at least one end face inclined to the axis thereof on the end remote from said clamping plate, a number of second bolt members mounted within said housing and each disposed opposite one of said first bolt members and having an inclined end face arranged to be contacted by said inclined face on said first bolt member, and said centering plate being rotatably mounted in said housing whereby as the inclined end faces of said first bolt members move in contact with the inclined end faces of said second bolt members said centering plate is rotated within said housing.

4. A device, as set forth in claim 3, wherein said housing having a longitudinally axially extending central bore therethrough, a bush positioned within the central bore in said housing, and said centering late being rotatably mounted on said bush for rotational movement within said housing.

5. A device, as set forth in claim 4, wherein said connecting rod extending through and being guided within said bush with an axially extending part of said rod extending from said bush in the direction of said clamping plate, said axially extending part of said rod having a spherical portion thereon, a socket within said clamping plate being arranged to receive the spherical portion of said connecting rod, and a bearing ring in threaded engagement with said clamping plate and enclosing a portion of said spherical part of said rod for securing said plate on said rod, whereby said clamping plate can swivel on said rod for adapting in the axial direction to uneven workpieces clamped within the device.

6. A device, as set forth in claim 5, wherein locking means in operative engagement with said connecting rod for securing said rod in a predetermined position.

7. A device, as set forth in claim 5, wherein said connecting rod having a threaded end on the portion extending from said bushing for attachment to a rod in a machine tool and a bore in the opposite end of said rod arranged to receive a central locking screw.

8. A device, as set forth in claim 1, wherein said housing has a plurality of angularly spaced bores extending therethrough in the longitudinal axial direction, means fitted within said bores for removably positioning said clamping jaws within said housing, said angularly spaced bores in said housing being elongated in the radial direction of said housing.

9. A device, as set forth in claim 8, wherein said means fitted within said bores comprises a sliding bush fitted within each of said bores, and one of said clamping jaws being secured within each of said sliding bushes.

10. A device, as set forth in claim 1, wherein said centering assembly includes a centering plate and mechanical means engaging said centering plate for imparting a rotary motion to said centering plate in response to axial movement of said clamping plate, said centering assembly including means for imparting radial displacement to said jaws in response to rotary movement of said centering plate.

11. A device, as set forth in claim 9, wherein said angularly spaced bores being formed by half circles at the radially inner and outer ends thereof with rectilinear side surfaces extending in parallel relationship between the half circles.

12. A device, as set forth in claim 9, wherein each of said clamping jaws comprising a base jaw having an extension fitted within said sliding bush, said base jaw having radially extending grooves therein, an interchangeable jaw mounted within the grooves in said base jaw, and means for securing said interchangeable jaw within said base jaw for varying the size of the opening provided by said jaws and for receiving workpieces of various sizes and further whereby said interchangeable jaws are reversible for gripping the workpieces from the outside or the inside.

13. A device, as set forth in claim 9, wherein a stud connected to each of said clamping jaws and extending in the longitudinal axial direction of said housing through said centering assembly and said clamping plate for effecting the axial movement of said clamping jaws.

14. A device, as set forth in claim 13, wherein each said stud having a ball-shaped end portion thereon at the end extending outwardly from said clamping jaw, a supporting ring mounted on said ball-shaped end portion, said supporting ring having a plane surface adapted to be engaged by a corresponding plane surface on said clamping plate whereby as said clamping plate is moved away from said jaws it contacts said supporting ring and effects the axial displacement of said clamping jaws into the clamped position.

15. A device, as set forth in claim 9, wherein a flange being formed on the end of said bush remote from said clamping plate and extending laterally from the axis of said bush, and stripping plates on the radially inner and outer ends of said flange for protecting gaps formed within the clamping device from being contaminated during the axial and radial movement of said clamping jaws.

16. A device, as set forth in claim 15, wherein segment-shaped plates being secured to the transverse face of said housing containing said clamping jaws and overlapping and in engagement with the edges of said laterally extending flanges of said bushings for providing a sliding guiding surface for said sliding bushes.

17. A device, as set forth in claim 16, wherein a support plate being mounted centrally on the transverse end of said housing containing said clamping jaws and overlapping the radially inner edges of said segment-shaped plates.

18. A device, as set forth in claim 17, wherein interchangeable jaws having a projection thereon extending laterally therefrom and arranged to contact said support plate when no workpiece is positioned between said interchangeable jaws in the closed position.

19. A device, set forth in claim 9, wherein said interchangeable jaws having a T-shaped end arranged to be engaged within the radially extending grooves in said base jaw.

20. A device, as set forth in claim 3, comprising means for rotating said centering plate in the opposite direction to that imported to said centering plate by the action of said first bolt members against said second bolt members.

21. A device, as set forth in claim 20, wherein said means for rotating said centering plate comprising a bore positioned within said housing extending chordally relative to the longitudinal axis thereof and being positioned adjacent to said centering plate and between said centering plate and the end of said housing containing said clamping jaws, biasing means within one of said bores, a lever arranged in operating engagement with said biasing means and being mounted with one end in said centering plate and the other end in said housing so that the action of said biasing means on said lever can rotate said centering plate in the direction for moving said clamping jaws into the closed position on a workpiece.

22. A device, as set forth in claim 21, wherein said biasing means comprising a pin member axially positioned within said bore, a plurality of cup-shaped springs mounted on said pin member and means for securing said springs on said pin member and for securing said biasing means within said bore.

23. A device, as set forth in claim 22, wherein said means comprising a disk member on the inner end of said pin member forming a stop for said springs.

24. A device, as set forth in claim 23, wherein an extension on said pin member extending through said disk member, said extension having a spherically shaped surface in contact with said lever.

25. A device, as set forth in claim 24, wherein said means for securing said springs on said pin member comprising a member for adjusting the force of said cup springs for varying the closing force exerted by said cup springs in rotating said centering plate and thereby moving said clamping jaws in the clamping direction.

26. A device, as set forth in claim 21, wherein an equalizing weight being fitted within the bore which does not contain said cup springs for avoiding imbalance of the device.

27. A device, as set forth in claim 21, wherein said lever comprising a longitudinally extending member having a ball-shaped end, a bush within said housing for receiving said ball-shaped end of said lever, a cylindrical end on the opposite end of said lever being located within said centering plate, a ring mounted on the cylindrical end of said lever and said ring having a spherically shaped outer surface in contact with the surface of said centering plate, and means for securing said ring on said lever.

28. A device, as set forth in claim 21, wherein said lever comprising a transversely extending central part extending generally in parallel relationship with the transverse surface of said centering plate and having a bearing pin at each end with said bearing pins extending in opposite directions, one of said bearing pins extending into said bore containing said biasing means and being arranged to be contacted by said biasing means, and the other said bearing pin extending into and secured within an opening in said centering plate.

29. A device, as set forth in claim 3, wherein the outer circumferential edge of said centering plate having a notch formed therein, a strain bolt fitted within said housing and extending inwardly therefrom and being arranged to be positioned between a first position in engagement within said notch for limiting the rotational movement of said centering plate and a second position with said strain bolt displaced from said notch whereby said centering plate is capable of completing its full rotational movement, and means for locking said strain bolt in position.